UNITED STATES PATENT OFFICE.

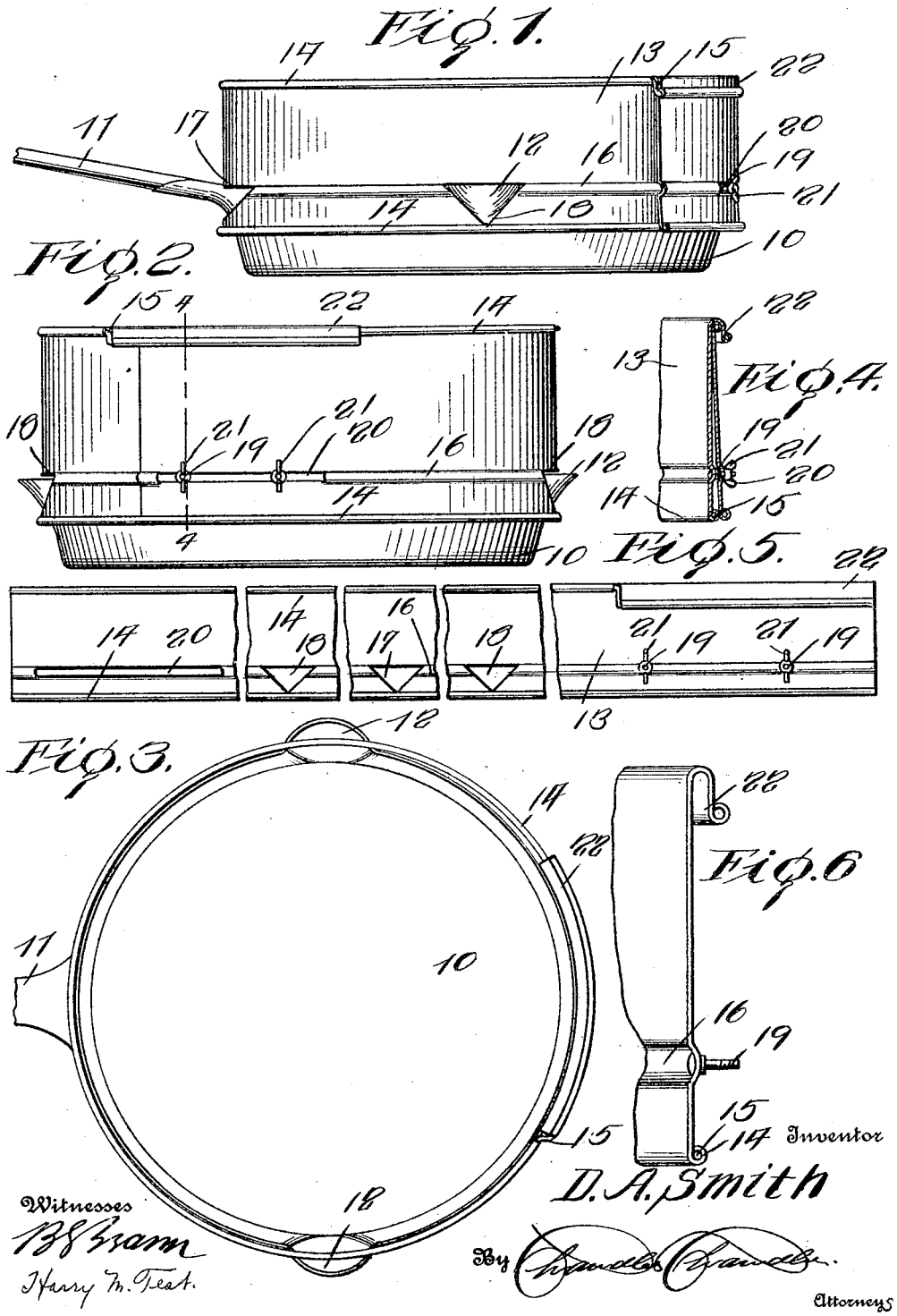

DORA A. SMITH, OF MYRTLE, MISSISSIPPI.

ATTACHMENT FOR COOKING UTENSILS.

1,128,538.  Specification of Letters Patent.  Patented Feb. 16, 1915.

Application filed August 4, 1913. Serial No. 782,934.

*To all whom it may concern:*

Be it known that I, DORA A. SMITH, a citizen of the United States, residing at Myrtle, in the county of Union, State of Mississippi, have invented certain new and useful Improvements in Attachments for Cooking Utensils; and I do hereby declare the following to be a full, clear, and exact description of the invention, such as will enable others skilled in the art to which it appertains to make and use the same.

This invention relates to improvements in cooking utensils and particularly to utensils used in baking.

The principal object of the invention is to provide a simple attachment for a frying pan to convert the pan into a baking pan for the purpose of baking deep or loaf cakes.

Another object is to provide such a device that the same can be quickly and easily attached to or detached from the ordinary frying pan so that the pan will hold a deep cake, and by removing the attachment the removal of the cake from the pan will be greatly facilitated.

Other objects and advantages will be apparent from the following description when taken in connection with the accompanying drawings.

In the drawings: Figure 1 is a side elevation of a frying pan showing my invention attached thereto. Fig. 2 is a front elevation of the same. Fig. 3 is a top plan view. Fig. 4 is a vertical fragmentary section on the line 4—4 of Fig. 2. Fig. 5 is a plan view of the attachment removed and straightened out. Fig. 6 is an end elevation of the device as seen in Fig. 5.

Referring particularly to the accompanying drawings, 10 represents an ordinary frying pan which is provided with the handle 11 and the lips 12, to which my invention is adapted to be applied.

My attachment is formed of any suitable material, as tin, sheet iron, aluminum, or stiff paper and is in the form of an elongated strip 13. The long edges of the strip are rolled as indicated at 14 and confined therein are the reinforcing wires 15. At a suitable distance from the lower edge of the strip, and extending from one end to the other is stamped a single corrugation 16, the indented portion of which is disposed inside of the device when it is folded in operative position, this indented portion or groove being arranged to receive the upper edge of the frying pan. In the approximate longitudinal center of the strip and a short distance above the lower edge is an opening 17 through which the handle 11 of the pan is adapted to project. At equally spaced distances from the opening 17 are formed openings 18 which are adapted to receive therethrough the pouring lips 12 of the pan.

Carried by the corrugation near one end of the strip and projecting beyond the outer face thereof are short threaded bolts 19, these bolts being arranged to be received through the longitudinal slot 20 formed in the strip adjacent the other end thereof. Suitable winged nuts 21 are threaded onto the bolts 19 and are adapted to bear against the portion of the strip at the sides of the slot 20 to hold the ends of the strip together and tightly clamped around the pan. At the end of the strip which contains the bolts 19 and in the upper edge thereof there is formed a downwardly extending flap 22, under which the upper edge of the slotted end is adapted to be slipped when the strip is placed around the pan.

In applying the strip to the pan, the handle is first inserted through the opening 17 and then the ends drawn around so that the upper edge of the pan fits into the groove, and the slotted end slipped under the flap 22 and the winged nuts turned to clamp the ends of the strip tightly together. When thus applied, the lips 12 of the pan project through the openings 18, the portion of the strip above the groove extending above the rim of the pan and thus providing for the baking of a deep cake in an ordinary frying pan.

By means of the bolts 19 and slot 20, the attachment can be adjusted to pans of various sizes.

It will of course be understood that this invention may be employed in connection with any pan whether it has handles or lips or not. It will also be understood that with the present construction the paper is so held up that it cannot dip into the cake and cause it to fall.

What is claimed is:

A device for converting a frying pan into a baking pan comprising an elongated strip of metal having rolled and reinforced marginal edges, a pressed groove formed longitudinally in the metal strip adjacent and parallel to the lower edge thereof, the upper edge of the pan being seated in said groove, the strip having triangular openings for the reception of the handle and the pouring lips of the pan, one end of the strip carrying bolts provided with clamping nuts, the opposite end of the strip having a longitudinally extending slot formed through the grooved portion thereof and receiving the bolts slidably therein, and an extension on the upper edge of the end of the strip above the bolts bent to embrace and hold the upper edge of the other end of the strip.

In testimony whereof, I affix my signature, in the presence of two witnesses.

Mrs. DORA A. SMITH.

Witnesses:
 Mrs. L. A. SOUTER,
 L. M. DARDEN.

Copies of this patent may be obtained for five cents each, by addressing the "Commissioner of Patents, Washington, D. C."